United States Patent
La Mura et al.

(10) Patent No.: US 6,565,442 B2
(45) Date of Patent: *May 20, 2003

(54) SYSTEM AND METHOD FOR ENHANCED ONLINE TRANSACTIONS USING SHOPPING GAMES

(75) Inventors: Pierfrancesco La Mura, Palo Alto, CA (US); Moshe Tennenholtz, Palo Alto, CA (US); Yoav Shoham, Palo Alto, CA (US)

(73) Assignee: Cariocas, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/885,719

(22) Filed: Jun. 19, 2001

(65) Prior Publication Data

US 2002/0147045 A1 Oct. 10, 2002

Related U.S. Application Data

(63) Continuation-in-part of application No. 09/643,890, filed on Aug. 18, 2000, now Pat. No. 6,468,159.

(51) Int. Cl.[7] .................................................. A63F 9/18
(52) U.S. Cl. .................................. 463/42; 463/1; 463/9; 463/40; 273/429; 273/430; 273/431; 273/432; 273/459; 273/461; 705/37; 725/24; 725/141
(58) Field of Search ............................. 705/37; 725/24, 725/141; 463/1, 9, 40; 273/429, 430, 431, 432, 459, 461

(56) References Cited

U.S. PATENT DOCUMENTS

| | | | |
|---|---|---|---|
| 4,745,468 A | 5/1988 | Von Kohorn | 725/141 |
| 5,057,915 A | 10/1991 | Von Kohorn | 463/9 |
| 5,508,731 A | 4/1996 | Kohorn | 725/24 |
| 5,916,024 A | 6/1999 | Von Kohorn | 463/40 |
| 5,964,660 A | 10/1999 | James et al. | 463/1 |
| 6,012,045 A | 1/2000 | Barzilai et al. | 705/37 |
| 6,044,363 A | 3/2000 | Mori et al. | 705/37 |
| 6,151,589 A | 11/2000 | Aggarwal et al. | 705/37 |
| 6,161,099 A | 12/2000 | Harrington et al. | 705/37 |

*Primary Examiner*—Jessica Harrison
*Assistant Examiner*—Yveste G Cherubin
(74) *Attorney, Agent, or Firm*—Sierra Patent Group, Ltd.

(57) ABSTRACT

An enhanced system and method for carrying out online transactions and auctions using a "shopping games" mechanism module is disclosed. The shopping games system provides for a mechanism scheme allowing "game moves" as well as bidding and message exchanging moves. The participants of the system may engage in game play in conjunction with an auction process, wherein the game play affects the auction process to provide a entertaining and amusing environment for participants to carry out online transactions without limiting the participants to traditional auction "moves".

26 Claims, 6 Drawing Sheets

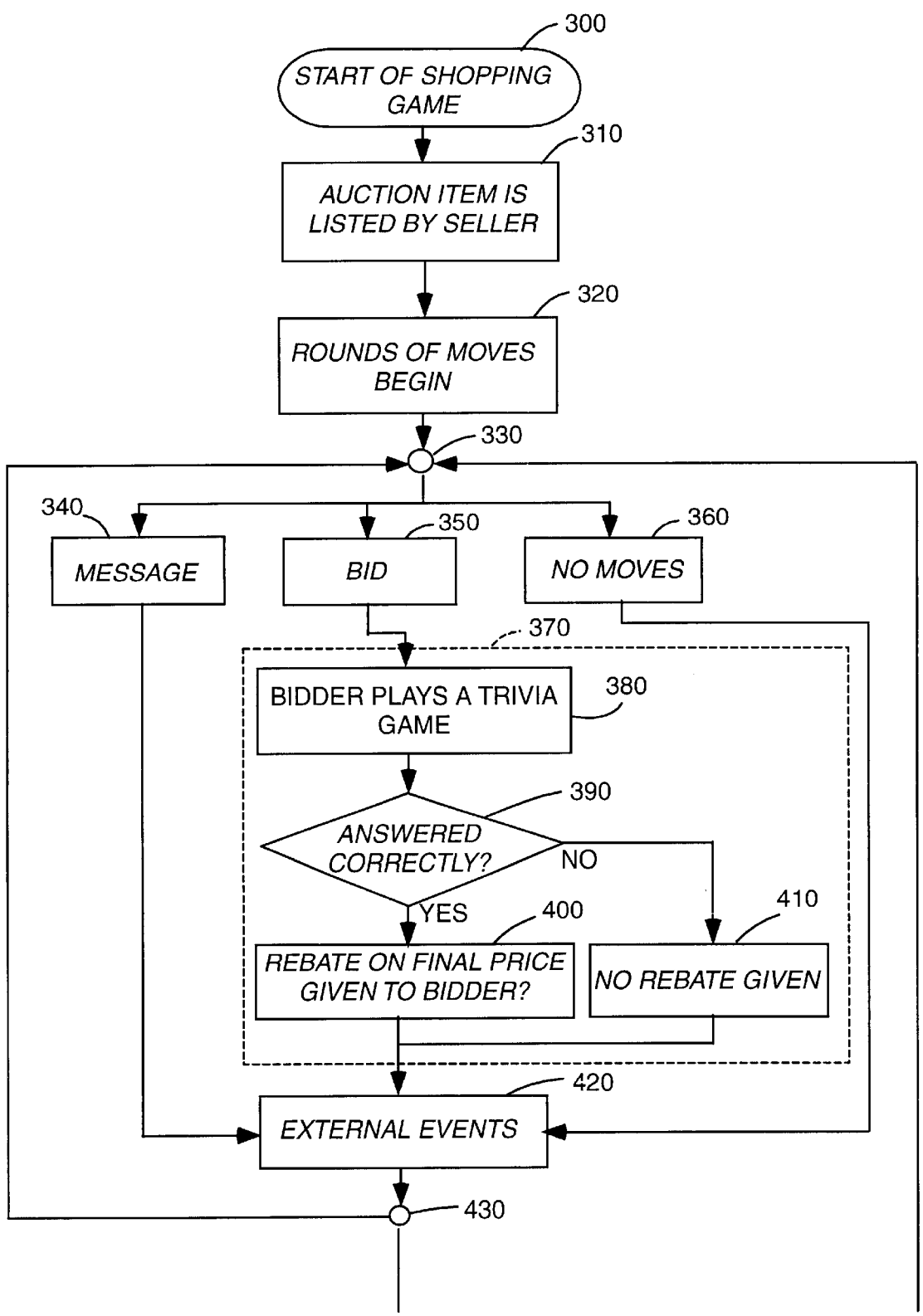
Fig. 4A          TO FIG.4B

SYSTEM AND METHOD FOR ENHANCED ONLINE TRANSACTIONS USING SHOPPING GAMES

PRIORITY CLAIM

This application is a Continuation-in-Part of application Ser. No. 09/643,890, now U.S. Pat. No. 6,468,159 filed Aug. 18, 2000.

BACKGROUND OF THE INVENTION

1. Field of the Invention

This invention pertains generally to online transactions. More particularly, the invention is an enhanced system and method for carrying out online transactions using a "shopping games" mechanism module.

2. The Prior Art

The use of the global information network known as the Internet as medium for carrying out sales transactions (i.e., online transactions) is known. The popularity of the Internet with home and business computer users has provided a market opportunity to provide transaction mechanisms for such Internet users. Retailers, for example, have launched "online catalogs" via Web pages as an alternative (or additional) means for selling their products or services to their customers.

Recently, online auctions have also gained popularity with Internet users. For example, web sites such as Ebay® and Ubid® provide conventional auction mechanisms, which allow sellers and buyers to engage in auction transactions. Current auctions are defined by a set of participants (sellers and buyers), a set of legal moves (namely, bidding moves and message exchanging moves) for the participants, one or more rounds of moves, each round followed by revelation of information (e.g., current highest bid, current bidders, highest bidder), and a stopping rule, which terminates any further bidding moves and clears the auction.

As noted above, the only legal moves provided by current auction schemes to participants include bidding moves (bids) and message exchanging moves. A bid submitted by a bidder for an item commits the bidder to pay some monetary amount if a given outcome occurs, the outcome resulting when the bidder is the highest bidder with a bid amount satisfying the seller's reserve (minimum) bid amount. Other than bids, the only other legal move provided to participants in current auction schemes are message exchanging moves (i.e., "cheap talk"), which are payoff-irrelevant exchanges of messages among participants. For example, a bidder may send an email to the seller inquiring into the description (requesting a picture, for example) of the item for sale by the seller.

In general, bids affect the information revelation and the relevant outcome. On the other hand, message exchanges only affect information revelation. Limiting the auction scheme to such legal moves, however, provides the participants with relatively few options and provides an uninteresting transaction scheme.

Conventional games on the Internet comprise many diverse types, including non-competitive, competitive and cooperative games, among others. Such games include various legal moves related to game play, but since online games are not associated with online auctions, "bids" are not within the scope of legal moves for games.

Accordingly, there is a need for an enhanced system and method for carrying out online transactions and auctions using a "shopping games" mechanism module which provides for a mechanism scheme allowing "game moves" as well as bidding and message exchanging moves. The present invention satisfies these needs, as well as others, and generally overcomes the deficiencies found in the background art.

BRIEF DESCRIPTION OF THE INVENTION

The present invention is a system and method for carrying out enhanced online transactions using shopping games. The online transaction system comprises an interface module operatively coupled for communication with a mechanism module. In general, the operations of the interface module together with the mechanism module provide an online "shopping game" transaction system wherein participants of the system may engage in game play in conjunction with an auction process to provide an entertaining and amusing environment for participants to carry out online transactions without limiting the participants to traditional auction "moves." The "shopping game" of the present invention may further be carried out with other online transactions including, for example, fixed-price sales as well as barter transactions.

The interface module provides an interface between participants of the online transaction systems. In particular, the interface module manages communication requests from the participants (sellers and bidders) of the system as described more fully below. The interface module further manages transactions associated with moves made by the participants of the system, such as when a seller lists an item for sale, or when a bidder places a bid on an item or plays a game relevant to an item for auction.

The mechanism module defines a set of "moves" which may be carried out by the participants of the system. In particular, the mechanism module allows bidders to issue bid moves, messaging moves and game moves relevant to an item for auction. As described more fully below, game moves or game outcomes may affect one or more relevant auction elements or events including, for example, the sale of the item, the selection of the participants, the bidding process, the information revelation, and the auction clearing process. Likewise, auction events may affect other auction or game elements including, for example, the pool of game participants, the set of possible game moves, the structure of information revelation, and the game outcome.

The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

BRIEF DESCRIPTION OF THE DRAWINGS

The present invention will be more fully understood by reference to the following drawings, which are for illustrative purposes only.

FIG. 4a is a logical flow diagram depicting the acts associated with a second illustrative shopping game transaction sequence in accordance with the present invention.

DETAILED DESCRIPTION OF THE PREFERRED EMBODIMENTS

People of ordinary skill in the art will realize that the following description of the present invention is illustrative only and not in any way limiting. Other embodiments of the invention will readily suggest themselves to such skilled people having the benefit of this disclosure.

Figure 1:
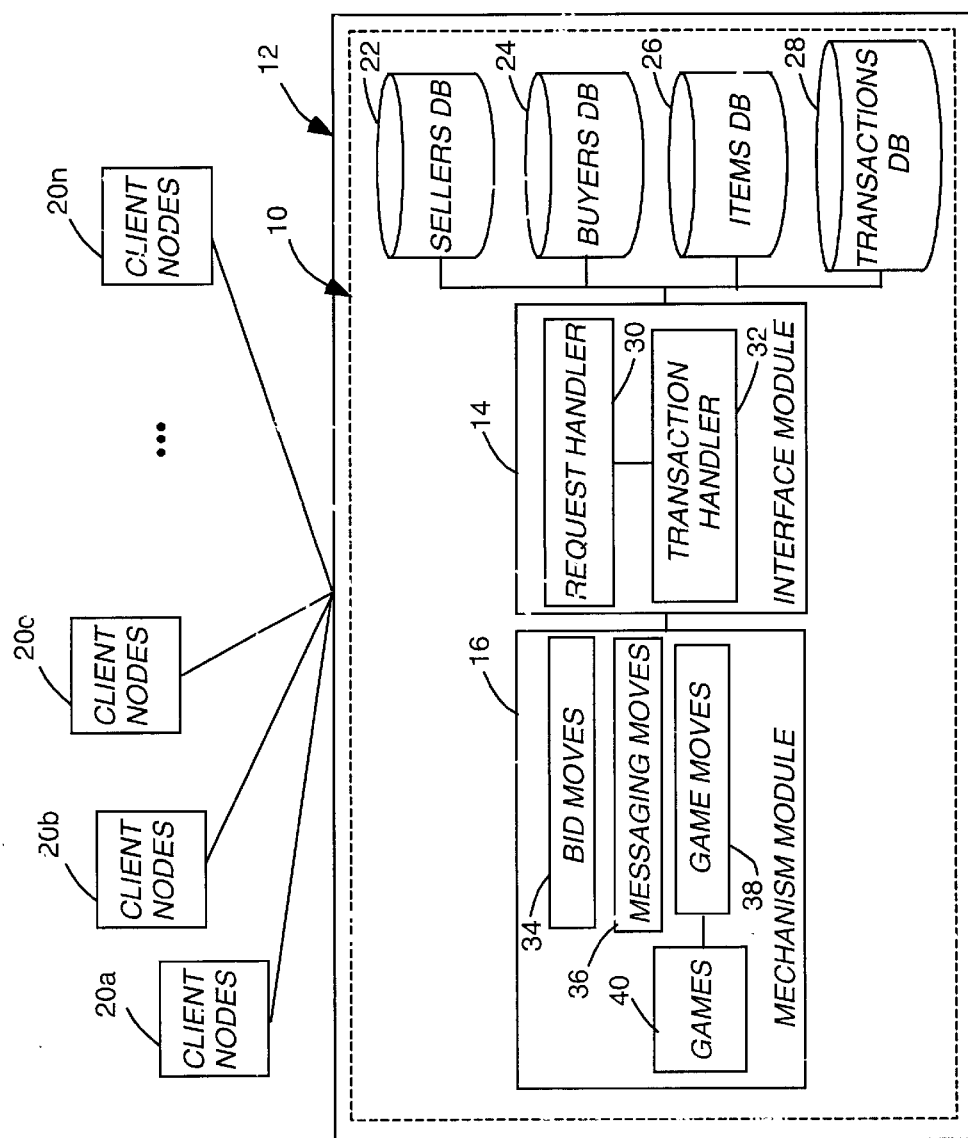
FIG. 1 is a functional block diagram depicting an illustrative shopping game system in accordance with the present invention.
Figure 2:
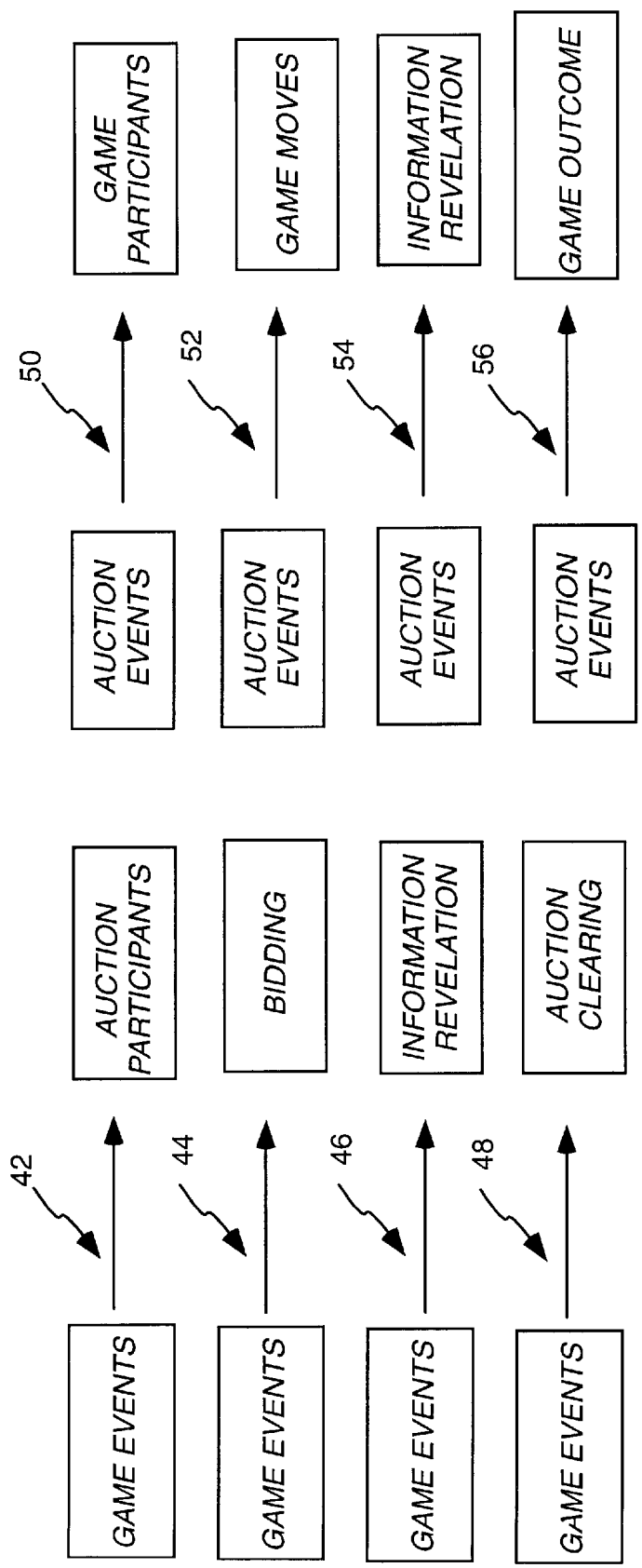
FIG. 2 is a block diagram depicting the causal relationship between game elements and auction elements in accordance with the present invention.

Referring more specifically to the drawings, for illustrative purposes the present invention is embodied in the apparatus shown in FIG. 1 and FIG. 2 and the method outlined in FIGS. 3a and 3b and FIGS. 4a and 4b. It will be appreciated that the apparatus may vary as to configuration and as to details of the parts, and that the method may vary as to details and the order of the steps, without departing from the basic concepts as disclosed herein. The invention is disclosed generally in terms of shopping game transactional system, although numerous other uses for the invention will suggest themselves to persons of ordinary skill in the art.

Referring first to FIG. 1, there is shown a functional block diagram depicting an illustrative shopping game system (SGS) 10 in accordance with the present invention. The SGS 10 operates within a network server 12 which can be any standard data processing means or computer, including a minicomputer, a microcomputer, a UNIX® machine, a mainframe machine, a personal computer (PC) such as INTEL® based processing computer or clone thereof, an APPLE® computer or clone thereof or, a SUN® workstation, or other appropriate computer.

Server 12 generally includes conventional computer components (not shown), such as a motherboard, a central processing unit (CPU), random access memory (RAM), display adapter, other storage media such as diskette drive, CD-ROM, flash-ROM, tape drive, PCMCIA cards and/or other removable media, a monitor, keyboard, mouse and/or other user interface means, a modem, network interface card (NIC), and/or other conventional input/output devices. The server 12 has loaded in its RAM a conventional server operating system (not shown) such as UNIX®, WINDOWS® NT, NOVELL®, SOLARIS®, LINUX or other server operating system. Server 12 also has loaded in its RAM web server software (not shown) such as APACHE®, NETSCAPE®, INTERNET INFORMATION SERVER™ (IIS), or other appropriate web server software loaded for handling HTTP (hypertext transfer protocol) or Web page requests.

In accordance with the invention, SGS 10 further comprises an interface module 14 operatively coupled for communication with a mechanism module 16, which are discussed in more detail below. SGS 10 is normally embodied in software executed by the server 12 and carrying out the operations described further below.

Server 12 is operatively coupled for communication to at least one client node (N) 20a, although typically Server 12 will be coupled to a plurality of nodes (20a through 20n), each operatively coupled for communication with the SGS 10, as shown in FIG. 1. Each client node 20a through 20n, like server 12, preferably comprises a standard computer such as a minicomputer, a microcomputer, a UNIX® machine, mainframe machine, personal computer (PC) such as INTEL®, APPLE®, or SUN® based processing computer or clone thereof, or other appropriate computer. Each client node 20a through 20n also includes typical computer components (not shown), such as a motherboard, central processing unit (CPU), random access memory (RAM), hard disk drive, display adapter, other storage media such as diskette drive, CD-ROM, flash-ROM, tape drive, PCMCIA cards and/or other removable media, a monitor, keyboard, mouse and/or other user interface means, a modem, network interface card (NIC), and/or other conventional input/output devices. Each client node 20a through 20n also has loaded in its RAM an operating system (not shown) such as UNIX®, WINDOWS® 98 or the like. Each client node 20a through 20n further has loaded in RAM a Web Browser program (not shown) such as NETSCAPE®, INTERNET EXPLORER®, AOL®, or like browsing software for client computers.

Each client node 20a through 20n is normally embodied in a conventional desktop or "tower" machine, but can alternatively be embodied in a portable or "laptop" computer, a handheld personal digital assistant (PDA), a cellular phone capable of browsing Web pages, a dumb terminal capable of browsing Web pages, an internet terminal capable of browsing Web pages such as WEBTV®, or other Web browsing devices.

Each client node 20a through 20n is networked for communication with server 12. Typically, a client node is operatively coupled to communicate with server 12 via the Internet through a phone connection using a modem and telephone line (not shown), in a standard fashion. A client node may alternatively be coupled to server 12 via a network (e.g., LAN, WAN, etc.) connection. It will be apparent to those skilled in the art having the benefit of this disclosure that alternative means for networking clients 20a through 20n and server 12 may also be utilized, such as a direct point to point connection using modems, satellite connection, direct port to port connection utilizing infrared, serial, parallel, USB, FireWire/IEEE-1394, and other means known in the art. Generally, client nodes 20a through 20n and server 12 communicate using the TCP/IP (transfer control protocol/internet protocol). However, other protocols for communication may also be utilized, including PPTP, NetBEUI over TCP/IP, and other appropriate network protocols.

While depicted as a single computer for purposes of disclosing an exemplary embodiment of the present invention, server 12 may comprise a plurality of servers (i.e., a server farm) to provide robust services to the client nodes 20a through 20n, as is known in the art.

As described above, the SGS 10 comprises an interface module 14 operatively coupled for communication with a mechanism module 16. The SGS 10 further comprises a data storage facility wherein data associated with operation of the SGS 10 is maintained. In the example system of FIG. 1, the data storage facility comprises a sellers database (DB) 22, a buyers DB 24, an items DB 26, and a transactions DB 28, each operatively coupled to the interface module 14. It will be appreciated that the structure of the data storage facility in FIG. 1 (DB 22 through 28) is only exemplary, and other database or storage facility arrangements may be used with the invention.

The interface module 14 comprises a request handler 30 coupled for communication with a transaction handler 32.

The request handler 30 is operatively coupled for communication with the client nodes 20a through 20n, normally via a network connection, such as an Internet connection. The request handler 30 carries out the operation of managing communications between the client nodes 20a through 20n and the SGS 10. For example, the SGS 10 may be configured as a "web" or "http" application, in which case the request handler 30 manages http requests from users of the client nodes 20a through 20n. Accordingly, the request handler 30 provides an interface (e.g., command line user interface, graphical user interface, or voice activated user interface) for shopping game participants (sellers and bidders) to engage in shopping games via request submitted from the client nodes 20a through 20n to the SGS 10. A request issued by a participant is communicated to the transaction handler for further processing. The results (outcome) of the transaction are communicated as a reply to the user via request handler 14.

The transaction handler 32 processes requests from participants of the SGS 10, which are communicated to the transaction handler 32 via the request handler 30. For example, when a seller lists an item for sale with the SGS 10, the transaction handler 32 manages the bids, messages, or game moves which are carried out by the participants as part of the shopping game process. The transaction handler 32 also manages such auction events as the selection of bidders, the beginning and ending of rounds of moves, the information revelation, and the clearing of the of auctions, for example.

The transaction handler 32 is coupled with the databases 32 through 28 for storage and retrieval of shopping game related data. DB 22 maintains a database of sellers, while DB 24 maintains a database of buyers or bidders. DB 26 maintains a database of items which are listed or have been listed for sale. DB 28 maintains a database of transactions (bids, messages, games, etc.) associated with items, which are maintained in DB 26. The structure of DB 22 through 28 may comprise any suitable format for data storage and retrieval such as a relational table, for example.

The interface module 14 is operatively coupled for communication to mechanism module 16. The mechanism module 16 defines the legal moves which may be carried out by the participants as part of the shopping game (i.e., when items are listed for sale). The mechanism module 16 defines bid moves 34, messaging moves 36, and game moves 38 as allowable moves during the shopping game transaction. The game moves 38 allowed by the mechanism module 40 are generally part of an online game (generally designated GAMES 40), here depicted as part of the SGS 10. Such games may include, for example, trivia games, puzzle games, competitive games, cooperative games, or other appropriate game.

When a request (e.g., a bid) is submitted by a participant to the SGS 10, the transaction handler 32 determines whether the request is proper according to the mechanism module 16. Unlike prior art auction models, the shopping game of the present invention allows game moves 38 (and the results of games) to affect one or more auction elements, such as the selection of bidders, the bidding process, the information revealed, and the auction terms, for example. Likewise, auction events may be used to affect game elements. This relationship between game events and auction elements is described more fully below in conjunction with FIG. 2.

According to the present invention, a shopping game transaction comprises a start phase, which is initiated when an item is listed for sale by a seller, a participant selection phase where potential bidders are selected to participate in the shopping game, a "game" phase, where participants may issue one or more moves (e.g., submit bids, exchange messages, play games) and where external events (uncontrolled by the participants) may take place, and a clearing phase which is triggered when an end of auction event occurs. During the clearing phase, a game may further be implemented which effects the auction clearing terms. The shopping game is completed at the conclusion of the clearing phase. Illustrative shopping game transactions are described more fully below in conjunction with FIGS. 3a, 3b and FIGS. 4a, 4b.

Referring now to FIG. 2, as well as FIG. 1, there is shown a block diagram depicting the causal relationship between game elements and auction elements in accordance with the present invention. Arcs 42 through 48 depict how game moves (and outcomes) affect auction elements. Arcs 50 through 56 depict how auction events affect game elements.

As noted above, the SGS 10 allows for game "moves" (participant actions) in addition to bid and messaging moves during the shopping game transaction. It is noted that one or more games may be implemented during one or more of the phases of the shopping game transaction. In general, at least one game is provided during the shopping game transaction. However, one or more of the arcs 42 through 56 may be implemented for a given "shopping game" system, such as SGS 10.

Arc 42 depicts the case where a game is used to select the auction participants (e.g., bidders) for an item for sale. For example, the two remaining players at the end of a game tournament may be entitled to participate in a second-price, sealed-bid auction for a featured item.

Arc 44 depicts the case where a game is implemented during the bidding process. For example, a trivia game may be implemented when a participant places a bid for an item in a first-price, ascending-bid auction, wherein the participant's bid is augmented by a given percentage (at no extra cost for the participant) if the participant answers a trivia question correctly.

Arc 46 depicts the case where a game affects the information revealed to a participant. For example, in a first-price, sealed-bid auction a participant who has not yet submitted a bid may be informed about the highest bid already submitted (and hence gain a strategic advantage over the other participants) if the participant successfully predicts the stock market index price within some given margin of error.

Arc 48 depicts the case where a game is implemented during the auction clearing phase. For example, a trivia game may be implemented with the successful bidder for an item, wherein the successful bidder receives a rebate on the sale price for the item if the participant answers a trivia question correctly.

Arcs 50 through 56 describe how auction events affect game elements. That is, not only do game events affect action elements such as participants, bidding, information revelation, and auction clearing, but auction events may also affect game elements, such as game participants, game moves, information revelation, and game outcome. Arc 50 depicts the case where an auction event selects the participants of a game. For example, all the auction participants who did not win the auctioned item may participate in a game which entitles the winner to receive a free rebate for the purchase of a similar item at a retailer store. In another example, only the highest bidders in a round of a multi-round auction (e.g. only bidders whose bids have been among the highest 50%) will be eligible to play a game that will take place from the end of the round to the end of the next round.

Arc 52 depicts the case where an auction event affects the game moves. For example, the participants in two parallel auctions for similar items may answer trivia questions in a community trivia game every time they submit a new bid. When the auctions are over, the joint (team) performance of the participants determines which of the two teams is the winner of the game, and the members of the winning team are entitled to a rebate on the auctioned item. In another example, based on their bids in a round of a multi-round auction different participants will be eligible to perform different moves in a game to take place until the end of the next round. For instance, if a participant A has made a higher bid than participant B, then participant A will be eligible to answer more trivia questions (that may lead to an advantage for participant A, such as a rebate) or to enter more stages of a new computer game than participant B.

Arc 54 depicts the case where an auction event affects the information revelation during the game. For example, in a jigsaw puzzle game the participants may observe a certain number of puzzle pieces before guessing the theme of the puzzle. The number of pieces that a given participant is allowed to observe may depend, in turn, on the total value of the items purchased in previous auctions by the participant. In another example, only the highest bidders in an auction (e.g. only bidders whose bids have been among the highest 50%) will be given some statistics about the bids made by the other participants before participating in a prediction game where they need to guess the average bid of other participants.

Arc 56 depicts the case where an auction event affects the game outcome. For example, the value of the game prizes may depend on the total revenue obtained by the seller in a given set of auctions. In another example, the highest bidders in a round in a multi-round auction (e.g. only bidders whose bids have been among the highest 50%) will be eligible to a larger prize if they win in an accompanied game (e.g. one gets double or some other multiple of the prize if they turn out to be winners in a trivia competition).

Figure 3A:
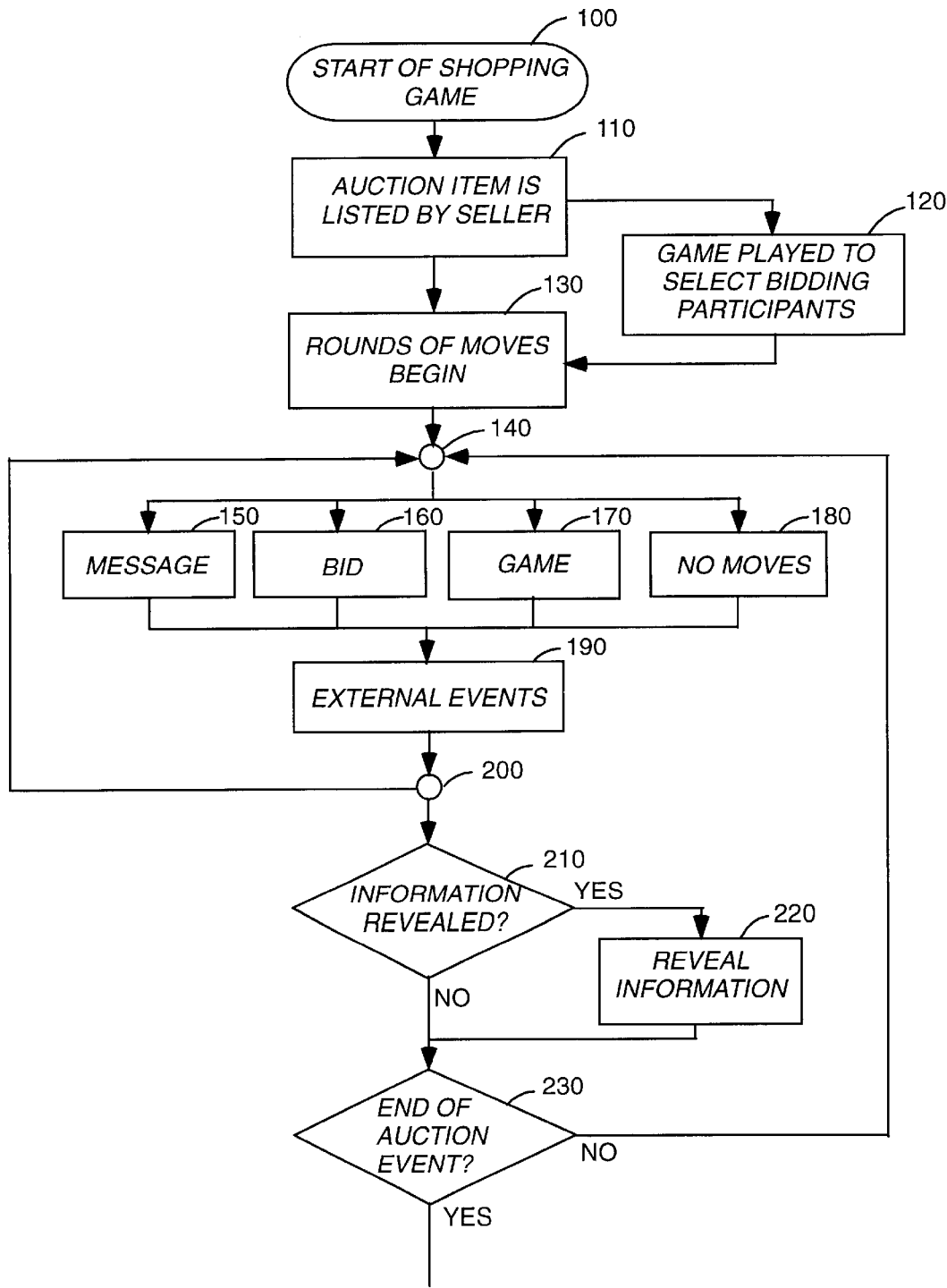
FIG. 3a is a logical flow diagram depicting the acts associated with a first illustrative shopping game transaction sequence in accordance with the present invention.
Figure 3B:
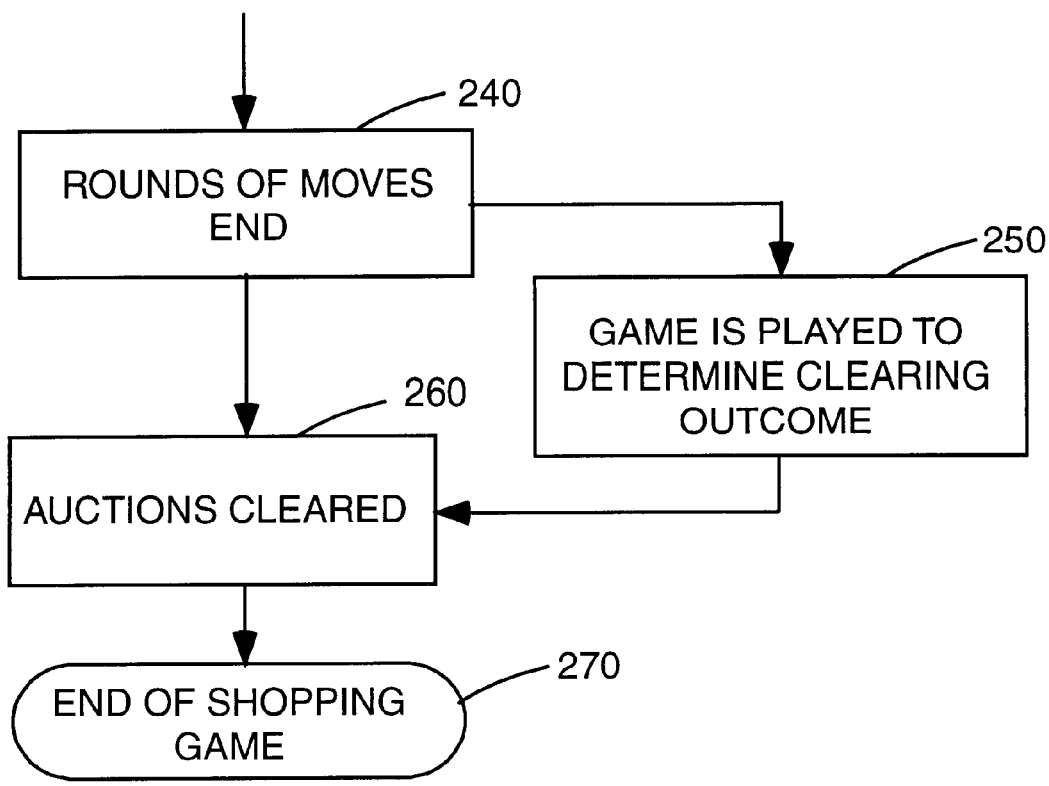
FIG. 3b is a continuation of the logical flow diagram of FIG. 3a depicting the acts associated with a first illustrative shopping game transaction sequence in accordance with the present invention.
Figure 4B:
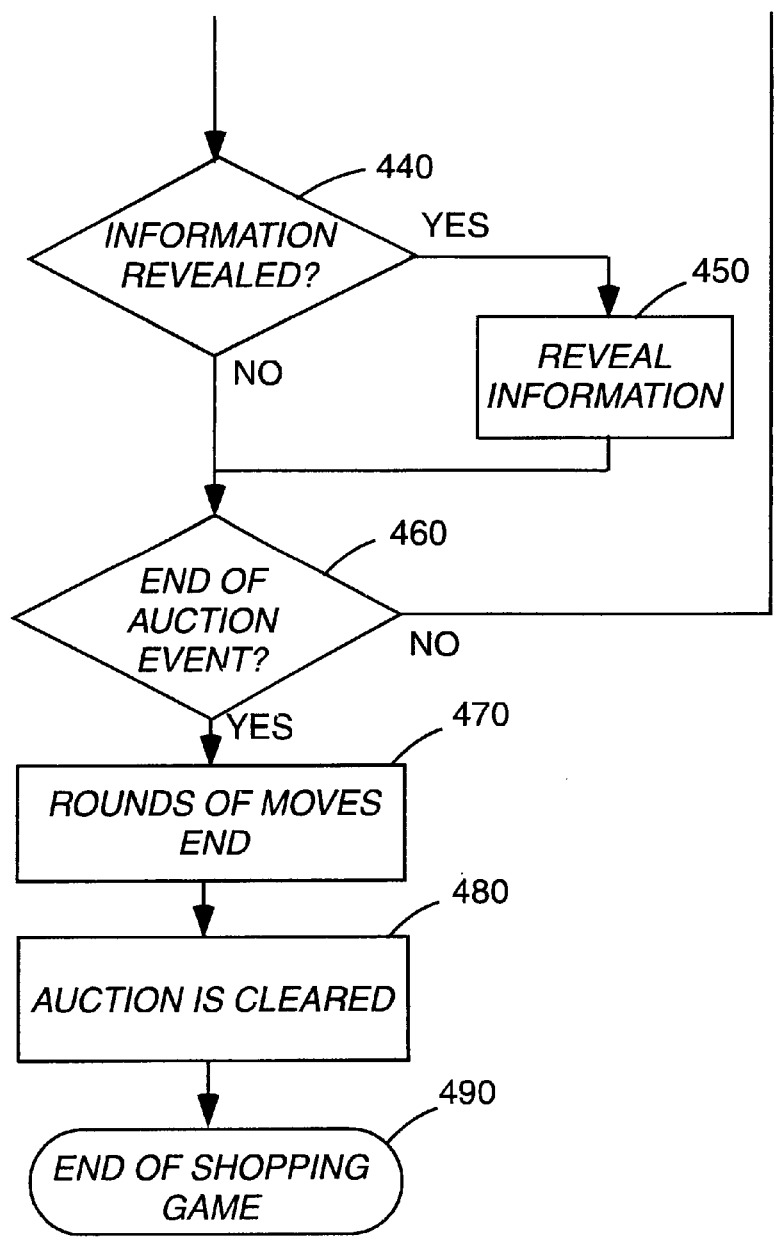
FIG. 4b is a continuation of the logical flow diagram of FIG. 4a depicting the acts associated with a second illustrative shopping game transaction sequence in accordance with the present invention.

The method and operation of invention will be more fully understood with reference to the logical flow diagrams of FIGS. 3*a*, 3*b* and FIGS. 4*a*, 4*b*, as well as FIG. 1 and FIG. 2. FIGS. 3*a*, 3*b* is a logical flow diagram depicting the acts associated with a first illustrative shopping game transaction sequence in accordance with the present invention. FIGS. 4*a*, 4*b* is a logical flow diagram depicting the acts associated with a second illustrative shopping game transaction sequence in accordance with the present invention. The order of actions as shown in FIGS. 3*a*, 3*b* and FIGS. 4*a*, 4*b* and described below is only exemplary, and should not be considered limiting.

As described above, the SGS 10 provides one or more games during the shopping game transaction process. The illustrative shopping game transaction model carried out by the process of FIGS. 3*a*, 3*b* provide game elements during the participant selection phase, the game phase, and auction clearing phase.

At process 100, the shopping game transaction begins. This process normally begins with box 110.

At box 110, an auction item is listed for sale by a seller. This process is normally carried out by a request by a seller via one of the client nodes 20*a* through 20*n*. The request is received by the request handler 30 and is carried out by the transaction handler 32. The transaction handler 32 records the item in the Items DB 26. In addition to specifying the item's (or the bundle's, if more than one type of item is offered for sale) description, the seller may also specify a reserve price, an ending date and time for the auction, the quantity of items of each type for sale, among others. The shopping game transaction then proceeds with either box 120 if a game is played to select the bidder or box 130 if the item is open for all bidders. Whether a game is played to select bidders (box 120) may be specified by the seller, or may alternatively be selected by the SGS 10 if so configured.

At box 120, a game is played to select the pool of bidders allowed to bid on the item for sale listed during box 110. Any suitable game for selecting a subset of bidders may be used. Typically the subset will be selected from the pool of participants in the Buyers DB 24. For example, the candidates may be invited to choose a song from a list. The song which is chosen by the highest number of candidates is declared the most popular. The candidates who chose the most popular song are then allowed to bid in the auction. Box 130 is then carried out.

At box 130, the bidding participants have been established, either by selecting a subset of bidders according to the game results of box 120, or by providing an open auction, where all bidders may participate. Box 130 also begins the "game play" phase, where one or more rounds of moves takes place. The shopping game transaction then proceeds at junction 140.

At junction 140, the shopping game participants may carry out a shopping game move. As illustrated in FIG. 3, the participants may issue a message (box 150), issue a bid (160), play a game (170), or make no move (180). Although indicated herein as possible options which may be carried out by the participants, the available moves (boxes 150 through 180) may also be required to be performed by the participants during this "game play" phase.

At box 150, the participant has issued a message. Here, the prospective (or actual) bidder may send a message (e.g., chat, e-mail) to the seller to inquire about the item for sale. For example, the bidder may ask about the quality or condition of the goods listed for sale. The seller may then reply to the bidder's message, if the seller selects to do so. This message transaction is allowed according to the mechanism module 16 as a legal move (messaging moves 36). This transaction may be carried by the transaction handler 32 (via conventional messaging modules (not shown)) and recorded in the Transaction DB 28. Box 190 is then carried out.

At box 160, the participant has placed a bid on the item for sale. The bidder typically identifies the item and specifies a bid price. This bid transaction is allowed according to the mechanism module 16 as a legal move (bid moves 34). The transaction is carried out by the transaction handler 32 and is recorded in the Transaction DB 28. Box 190 is then carried out.

At box 170, the participant has chosen to play a game. Game moves are allowed because the mechanism module 16 allows for game moves 38. The game played by the participant is provided by the games module 40. The game may be communicated to the user via the request handler 30 for playing on the client node (e.g., a java or javascript game), or may be played on the SGS 10, wherein game play commands from the user are received by the request handler 30 and game play user interface (graphical, sound, prompts, etc.) are communicated to the user by the request handler (e.g., an html game). Other arrangements for playing games may also be used, such as telephones, email, etc. The game play results are used to affect one or more auction elements, such as what information is revealed to the participant, whether the auction is ended, or whether the participant receives a rebate, among others. The game transaction is carried out by the transaction handler 32 and is recorded in the Transaction DB 28. It is appreciated that while described herein as a complete game, box 170 may also be implemented as a single "game move" carried out as part of a larger game. Box 190 is then carried out.

At box 180, the participant has elected not to make a move. For example, the participant may not be interested in purchasing the item for sale. Box 190 is then carried out.

At box 190, an external event may take place which affects an auction element. For example, the end of auction event may be dictated by the triggering of some external event, such as when the date and time reaches a predetermined value. However, other external events may be used to affect other auction elements. For example, the auction may end when the price of some given stock reaches a certain treshold, or when the temperature in San Francisco falls below 60 degrees, etc. The shopping game transaction then proceeds at junction 200.

At junction 200, the transaction game processing may return to 140 or may continue to diamond 210. Processing returns to 140, where a shopping game move is directly followed by another shopping game move. For example, where a bid is followed by a game, processing flows from box 160 and box 190, then to box 170 and box 190. Other shopping game moves carried out in "serial" may also be provided according to the SGS 10.

At diamond 210, the transaction handler 32 determines whether information is revealed to the participants of the shopping game. This determination may be made according to one or more factors, including whether an external event has taken place, whether a bid has placed (thereby increasing the current highest bid), or as a result of a game outcome, among others. If information is to be revealed to the participant, box 220 is carried out. Otherwise diamond 230 is then carried out.

At box 220, the information determined to be revealed to the participant is communicated by the request handler 30. Diamond 230 is then carried out.

At diamond 230, the transaction handler 32 determines whether an end of auction event has occurred. As described above, an end of event may be triggered by a move (e.g., game result) or an external event (e.g., date and time). If the end of auction event has occurred box 240 is then carried out. Otherwise processing of the round of moves ("game play" phase) continues at junction 140.

At box 240, the game play phase has concluded due to an end of auction event. The shopping game transaction now continues to the auction clearing phase. According to the invention, a game may further be played during this phase to affect the auction clearing events, in which case box 250 is then carried out. If a game is not to be played during this phase box 260 is then carried out, bypassing box 250.

At box 250, a game is played to determine the clearing outcome. For example, a trivia game may be played by the winning bidder, wherein a rebate to the sale price is provided if the winning bidder answers a trivia question correctly. The trivia game example is only illustrative and other games may also be used to determine the clearing outcome. As described above for other games, the game transaction is carried out by the transaction handler 32 and is recorded in the Transaction DB 28. Box 260 is then carried out.

At box 260, the auction is cleared by the transaction handler 32. Clearing involves determining the sale terms (price, delivery options, etc.) and communicating the sale terms to the seller and winning bidder, if any, by parsing the data from the Transaction DB 28. The item for sale is then flagged as closed in the items DB 26. The shopping game is thus concluded as indicated by process 270.

The illustrative shopping game transaction model carried out by the process of FIGS. 4a, 4b provide a game element following the bidding process during the "game play" phase of the transaction. FIGS. 4a, 4b shown only an illustrative model of a shopping game according to the invention, and should not be considered limiting.

At box 300, the shopping game transaction begins. This process begins with box 310.

At box 310, an auction item is listed for sale by a seller. This process is normally carried out by a request by a seller via one of the client nodes 20a through 20n. The request is received by the request handler 30 and is carried out by the transaction handler 32. The transaction handler 32 records the item in the Items DB 26. As described above, the seller may also specify a reserve price, an ending date and time for the auction, some uncertain external event which affects some element of the auction, among others. Box 320 is then carried out.

At box 320, the bidding participants have been established. In the present example, the shopping game includes an open auction, where all bidders may participate. Box 320 also begins the "game play" phase, where one or more rounds of moves takes place. The shopping game transaction then proceeds at junction 330.

At junction 330, the shopping game participants may carry out a shopping game move. As illustrated in FIGS. 4a, 4b, the participants may issue a message (box 340), issue a bid (350), or make no move (360).

At box 340, the participant has issued a message. Here, the prospective (or actual) bidder may send a message (e.g., chat, e-mail) to the seller to inquire about the item for sale. The seller may then reply to the bidder's message, if the seller elects to do so. This message transaction is allowed according to the mechanism module 16 as a legal move (messaging moves 36). This transaction may be carried by the transaction handler 32 (via conventional messaging modules (not shown)) and recorded in the Transaction DB 28. Box 420 is then carried out.

At box 350, the participant has placed a bid on the item for sale. The bidder typically identifies the item and specifies a bid price. This bid transaction is allowed according to the mechanism module 16 as a legal move (bid moves 34). The transaction is carried out by the transaction handler 32 and is recorded in the Transaction DB 28. Game 370, which is then carried out. As indicated above, the present example depicts a shopping game where a bid move is followed by a game (game 370). Game 370, which is described further below, may be any online game, but in the present example comprise the trivia game depicted by process elements 380 through 420. At the conclusion of the game, processing continues at box 420.

At box 360, the participant has elected not to make a move. For example, the participant may not be interested in purchasing the item for sale. Box 420 is then carried out.

Referring again to game 370, an its associated elements (380 through 420), an example trivia game is disclosed, although any suitable online game may be also be used. At box 380, the bidder (of box 350) is presented with a trivia question, via a communication from the request handler 30. This communication may be in the form of a conventional web page or include additional programming instructions (java or javascript). The bidder then responds with a reply indicating the bidder's answer to the trivia question. Diamond 390 is then carried out.

At diamond 390, the request handler 30 receives the bidder's reply answer and communicates the reply to the transaction handler 32 for further processing. The transaction handler 32 determines whether the bidder answered correctly in which case box 400 is then carried out. If the bidder answered incorrectly, box 410 is then carried out.

At box 400 the bidder has answered the trivia question correctly and is given a rebate to the final sale price (should the bidder win the auction). This game transaction including the rebate is recorded by the transaction handler 32 to the Transaction DB 28. Box 420 is then carried out.

At box 410 the bidder has answered the trivia question incorrectly and is not given a rebate to the final sale price. This game transaction is recorded by the transaction handler 32 to the Transaction DB 28. Box 420 is then carried out.

At box 420, an external event may take place which affects an auction element. For example, the end of auction event may be dictated by the triggering of some external event, such as when the date and time reaches a predetermined value. Other external events may be used to affect other auction elements. The shopping game transaction then proceeds at junction 430.

At junction 430, the transaction game processing may return to 330 or may continue to diamond 440. Processing returns to 330, where a shopping game move is directly followed by another shopping game move, as noted above.

At diamond 440, the transaction handler 32 determines whether information is revealed to the participants of the shopping game. This determination may be made according to one or more factors, including whether an external event has taken place or as a result of a game outcome, among others. If information is to be revealed to the participant, box 450 is carried out. Otherwise diamond 460 is then carried out.

At box 450, the information determined to be revealed to the participant is communicated by the request handler 30. Diamond 460 is then carried out.

At diamond 460, the transaction handler 32 determines whether an end of auction event has occurred. As described above, an end of event may be triggered by a move (e.g., game result) or an external event (e.g., date and time). If the end of auction event has occurred box 470 is then carried out. Otherwise processing of the round of moves ("game play" phase) continues at junction 330.

At box 470, the game play phase has concluded due to an end of auction event. The shopping game transaction now continues to the auction clearing phase and box 480 is then carried out.

At box 480, the auction is cleared by the transaction handler 32. Clearing involves determining the sale terms (price, delivery options, etc.) and communicating the sale terms to the seller and winning bidder, if any, by parsing through the Transaction DB 28. The item for sale is then flagged as closed in the items DB 26. The shopping game is thus concluded as indicated by process 490.

Accordingly, it will be seen that this invention provides a system and method for carrying out enhanced online transactions using shopping games wherein participants of the system may engage in game play in conjunction with an auction process to provide a entertaining and amusing environment for participants to carry out online transactions without limiting the participants to traditional auction "moves". Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. In a computer device, an online shopping game system having at least one seller and at least one bidder, said transaction system comprising:
   a) an interface module configured to provide a user interface between the seller and the bidder, said interface module further configured to manage transactions associated with moves made by the seller and the bidder in conjunction with a sale of item by the seller; and
   b) a mechanism module operatively coupled for communication with said interface module, said mechanism module defining a set of legal moves which may be issued as a transaction by the seller and the bidder, said set of legal moves including game moves, said moves carried in conjunction with the sale of the item by the seller, said game moves affecting an element of the sale of the item.

2. The shopping game system of claim 1, wherein said sale element is a pool of prospective bidders who are allowed to bid on the item of sale.

3. The shopping game system of claim 1, wherein said sale element is information which is revealed to the bidder.

4. The shopping game system of claim 1, wherein said sale element is the terms of the sale.

5. The shopping game system of claim 1, wherein said game moves culminate in a game result, said game result affecting an element of the sale of the item.

6. The shopping game system of claim 5, wherein said sale element is a pool of prospective bidders who are allowed to bid on the item of sale.

7. The shopping game system of claim 5, wherein said sale element is information which is revealed to the bidder.

8. The shopping game system of claim 5, wherein said sale element is the terms of the sale.

9. The shopping game system of claim 1, wherein sale elements and events affect an element of a game.

10. The shopping game system of claim 9, wherein said element of a game is the pool of game participants.

11. The shopping game system of claim 10, wherein said sale elements and said events affect the pool of game participants by having all the auction participants who did not win the auctioned item participate in a game which entitles the winner to receive a free rebate for the purchase of a similar item at a retailer store.

12. The shopping game system of claim 9, wherein said element of a game is the set of possible game moves.

13. The shopping game system of claim 12, wherein said sale elements and said events affect the set of possible game moves when participant A has made a higher bid than participant B, then participant A will be eligible to answer more trivia questions.

14. The shopping game system of claim 9, wherein said element of a game is the structure of information revelation in the game.

15. The shopping game system of claim 14, wherein said sale elements and said events affect the structure of information revelation in the game by having only the highest bidders in an auction given statistics about bids made by other participants before participating in a prediction game where said highest bidders need to guess an average bid of said other participants.

16. The shopping game system of claim 9, wherein said element of a game is the game outcome.

17. The shopping game system of claim 16, wherein said sale elements and said events affect the game outcome by having the highest bidders in a round in a multi-round auction eligible for a larger prize if said highest bidders win in an accompanied game.

18. In a computer device, an online transaction system having at least one seller and at least one bidder, said transaction system comprising:
   a) an auction module configured to list at least one item for sale by a seller and to receive at least one bid submitted by a bidder for the item for sale, said auction module including auction elements and auction events, said auction module further configured to close the item for sale upon a predetermined event defined by the seller;
   b) a game module comprising at least one game operatively coupled for communication with said auction module, said game including game elements, said game associated with the item for sale by the seller, said game further configured for play by the bidder submitting the bid for the item for sale, said game further configured to produce a game outcome according to play activity performed by the bidder, and said game outcome affecting the terms of the sale for the item.

19. The online transaction system of claim 18, wherein said game comprises a trivia game, said trivia game configured to present to said bidder a trivia question and a plurality of answer choices, one of which is the correct answer, said trivia game further configured to receive from said bidder an answer selection and generate a game result, said game result affecting the terms of the sale for the item.

20. The online transaction system of claim 18, wherein said game result is a price rebate for the item for sale.

21. The online transaction system of claim 18, wherein, said game elements are affected by said auction elements and by said auction events.

22. The online transaction system of claim 21, wherein said auction elements and said auction events are selected from the group consisting of auction participants, bidding, information revelation and auction clearing.

23. The online transaction system of claim 21, wherein said game elements are selected from the group consisting of game participants, game moves, information revelation, and game outcome.

24. The online transaction system of claim 18, wherein said auction elements are affected by said game elements.

25. The online transaction system of claim 18, wherein said auction events are affected by said game elements.

26. The online transaction system of claim 18, wherein said auction elements and said auction events are affected by said game elements.

* * * * *